United States Patent [19]
Sathe

[11] Patent Number: 6,093,579
[45] Date of Patent: Jul. 25, 2000

[54] LOW PRESSURE SENSOR WITH A THIN BOSS AND METHOD OF MANUFACTURE

[75] Inventor: Abhijeet D. Sathe, Fremont, Calif.

[73] Assignee: Exar Corporation, Fremont, Calif.

[21] Appl. No.: 09/088,427

[22] Filed: Jun. 1, 1998

Related U.S. Application Data

[60] Provisional application No. 60/071,426, Jan. 14, 1998.

[51] Int. Cl.⁷ .................................................. H01L 21/00
[52] U.S. Cl. .................................. 438/53; 438/50; 438/51
[58] Field of Search .................................. 438/50, 51, 53

[56] References Cited

U.S. PATENT DOCUMENTS

| | | | |
|---|---|---|---|
| 5,002,901 | 3/1991 | Kurtz et al. | 438/53 |
| 5,702,619 | 12/1997 | Kurtz et al. | 438/53 |
| 5,891,751 | 4/1999 | Kurtz et al. | 438/53 |

OTHER PUBLICATIONS

"Compensation Structures for Convex Corner Micromachining in Silicon," Puers, et al., *Sensors and Actuators*, A–21–A23, (1990) pp. 1036–1041.

"Improvement of Piezoresistive Multiple Sensor," Ugai, et al., The 7th Int'l Conference on Solid State Sensors and Actuators, *Digest of Technical Papers*, pp. 602–605, no date.

*Primary Examiner*—Kevin M. Picardat
*Attorney, Agent, or Firm*—Townsend and Townsend and Crew LLP

[57] ABSTRACT

A robust and highly sensitive pressure sensing device with good linearity made with a thin-bossed diaphragm, and a process to manufacture the same that involves minimal additional steps and is fully compatible with conventional bulk micromachining processes that are used to make standard pressure sensors.

11 Claims, 2 Drawing Sheets

LOW PRESSURE SENSOR WITH A THIN BOSS AND METHOD OF MANUFACTURE

This application claims the benefit of U.S. provisional application No. 60/071,426, filed Jan. 14, 1998.

BACKGROUND OF THE INVENTION

The present invention relates in general to pressure sensing devices, and in particular to an ultra-sensitive pressure sensor with a thin boss structure and related methods of manufacture.

Pressure sensors can be found in a variety of applications including medical devices, automobile exhaust systems and gas tanks, industrial processes and consumer products such as pressure gauges. A common type of pressure sensor uses a silicon die that is micromachined to create a cavity in a central portion of the die that results in an area that is substantially thinner than the rest of the die. The thin area of the silicon die, commonly referred to as the diaphragm, is thin enough to deflect when subject to pressure. Piezo-electric resistors are then strategically located around the periphery of the diaphragm such that their resistance values change in response to the stress caused by the deflection of the diaphragm. The piezo-electric resistors are typically connected between a power supply and ground in a bridge network, and thus output a different voltage level in response to the variations in the resistance values.

The response of a pressure sensor is typically measured by its sensitivity and linearity. Sensitivity generally refers to the output voltage for unit pressure at unit supply voltage and is measured in mV/V/psi. In a conventional pressure sensor, a thinner diaphragm results in a device that can sense smaller amounts of pressure, but one that is much less linear. Therefore, overall performance (sensitivity and linearity) is not improved by simply making the diaphragm thinner. FIG. 1 shows the performance of two different pressure sensors. Sensor 1 is highly sensitive (steep curve) but has a linear range that is shorter than Sensor 2. Sensor 2, on the other hand, is less sensitive but has better linearity. A major challenge in designing pressure sensors is to simultaneously make the curve steeper and extend its linear range.

One approach that has improved the sensitivity of pressure sensors uses a bossed diaphragm. In this approach, when creating the cavity in the silicon substrate, a central portion of the region is masked such that the resulting diaphragm is in the form of a rectangular or square track (or an octagonal track). The masked portion that does not get removed from the center of the die is referred to as the boss. This center boss adds mass to the center of the diaphragm and essentially acts as a stress concentrator focusing the stress fields more toward the location of the piezo-resistors. The resulting structure suppresses nonlinearity of the output and results in a more sensitive device.

The bossed diaphragm structure has offered appreciable but still limited improvement in the performance of pressure sensors. There is always a need for pressure sensors with increased sensitivity to meet the demands of newer applications.

SUMMARY OF THE INVENTION

The present invention provides an ultra-sensitive pressure sensor with a thin boss structure, and related methods of manufacture. Broadly, according to the present invention, the center boss is etched away to a thickness that is substantially smaller than the thickness of the substrate. By reducing the relative size of the boss, the device becomes less sensitive to gravitational forces (g-forces), making it more robust. With the thin boss it is possible to obtain higher sensitivity while maintaining good linearity. The preferred method of manufacture of the thin-boss structure according to the present invention is compatible with typical bulk micromachining processes, resulting in minimal cost increase.

Accordingly, in one embodiment, the present invention provides a pressure sensor including a silicon substrate having a first thickness, a cavity micromachined through the silicon substrate to form a diaphragm having a second thickness substantially smaller than the first thickness, and a boss located at the center of the cavity that has a third thickness that is substantially smaller than the first thickness yet substantially larger than the second thickness.

In another embodiment, the present invention provides a method for manufacturing a pressure sensor including the steps of providing a silicon substrate having a first thickness, and forming a cavity in the silicon substrate to obtain a diaphragm having a second thickness substantially smaller than the first thickness, and a centrally located thin boss that has a third thickness that is substantially smaller than the first thickness yet substantially larger than the second thickness.

A better understanding of the nature and advantages of the thin boss pressure sensing device of the present invention may be gained by referring to the detailed description and the drawings below.

DESCRIPTION OF THE PREFERRED EMBODIMENT

Conventional processes for manufacturing bossed pressure sensors yield a boss that has about the same thickness as the silicon substrate. Increasing the sensitivity of a device with such a boss, results in increasing the sensitivity of the device to gravitational forces, both during the processing of the Silicon wafer and after assembly as a pressure sensing device. In one embodiment, the present invention provides a sensor with a diaphragm that supports a substantially smaller boss, thus significantly reducing the sensor's sensitivity to gravitational forces and therefore make a more robust part. The present invention also provides an efficient and cost-effective method of manufacturing a thin bossed diaphragm.

Figure 2A:
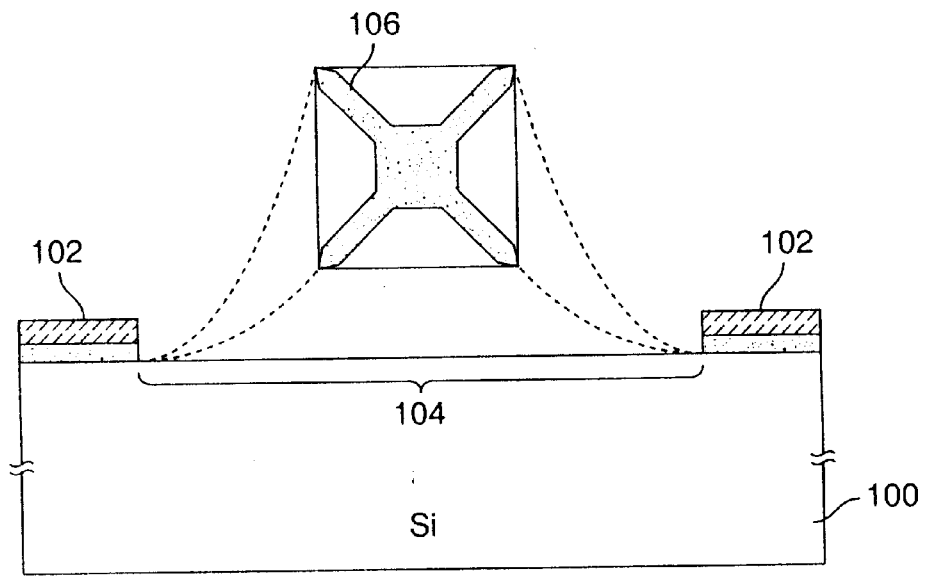
FIGS. 2A, 2B, 2C, 2D, and 2E illustrate cross-sectional views of a Silicon die during the various processing steps according to the present invention to manufacture a thin-boss pressure sensing device.

FIGS. 2A, 2B, 2C, 2D, and 2E illustrate cross-sectional views of the Silicon die during the various steps of the manufacturing process according to the present invention. In a first step shown in FIG. 2A, a special pattern of protective layer is formed on the surface of silicon die 100. The protective layer includes a portion 102 that masks the entire die except for a central portion that forms diaphragm window 104, and a portion 106 that lays on top of diaphragm window 104. Protective layers 102 and 106 are made of commonly used materials such as Silicon Dioxide or Silicon Nitride (or a combination), and are formed on the surface of the die using well known oxidation and chemical vapor deposition (CVD) techniques. A top view of an exemplary embodiment for mask 106 is shown in FIG. 2A to illustrate the corner compensation structure of the mask. Due to the orientation of the various crystal planes in the Silicon substrate, a special corner compensation structure is required to create a trapezoidal (or near trapezoidal) boss when the Silicon is etched. Corner compensation masks such as the one shown in FIG. 2A have been used to manufacture conventional (full thickness) bossed diaphragms.

Figure 2B:
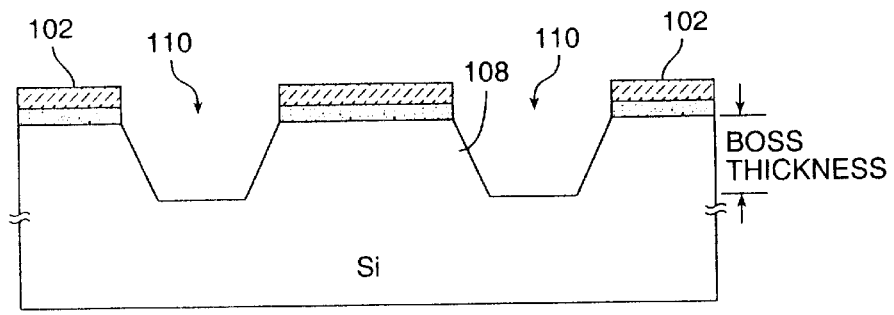

The oxidation, CVD and masking steps which form layers 102 and 106 are followed by a pre-etch step. During the pre-etch step, the exposed regions of the die are etched using either wet or dry etching techniques. Instead of etching all the way down to the thickness of the diaphragm, this pre-etch step performs a shallow etch of the exposed area to the desired final thickness of the boss. The cross section of the die after this shallow pre-etch step is shown in FIG. 2B where reference numeral 108 indicates the mass that results in the final boss. In an exemplary embodiment of the present invention, Silicon substrate 100 may be around 350–550 μm thick, while the resulting boss may be e.g., 40 μm to 80 μm thick, and the thin diaphragm is e.g., 10 μm (after the completion of the process). Thus, this pre-etch step results in a 40–50 μm deep trench 110.

Next, the Silicon Dioxide or Nitride layer 106 on top of boss 108 is photolithographically removed to expose the silicon surface of boss 108. The photolithography process to remove mask 106 involves a first step of spinning photoresist on the die surface including trench 110. In a preferred embodiment, to ensure complete step coverage by the photoresist, the spin speed is reduced to about e.g., 1500–2000 rpm range and the spread speed is reduced to e.g., 350–600 rpm. Next, single sided alignment with an appropriate mask designed to expose the entire surface of the corner compensation structure 106 is performed. The Oxide or Nitride in the exposed area (i.e., covering boss 108) is then removed with standard wet or dry etch methods such as SF6 plasma etch or BOE etch. The die, a cross-section of which is shown in FIG. 2C, is then cleaned in preparation for subsequent steps.

Figure 1:
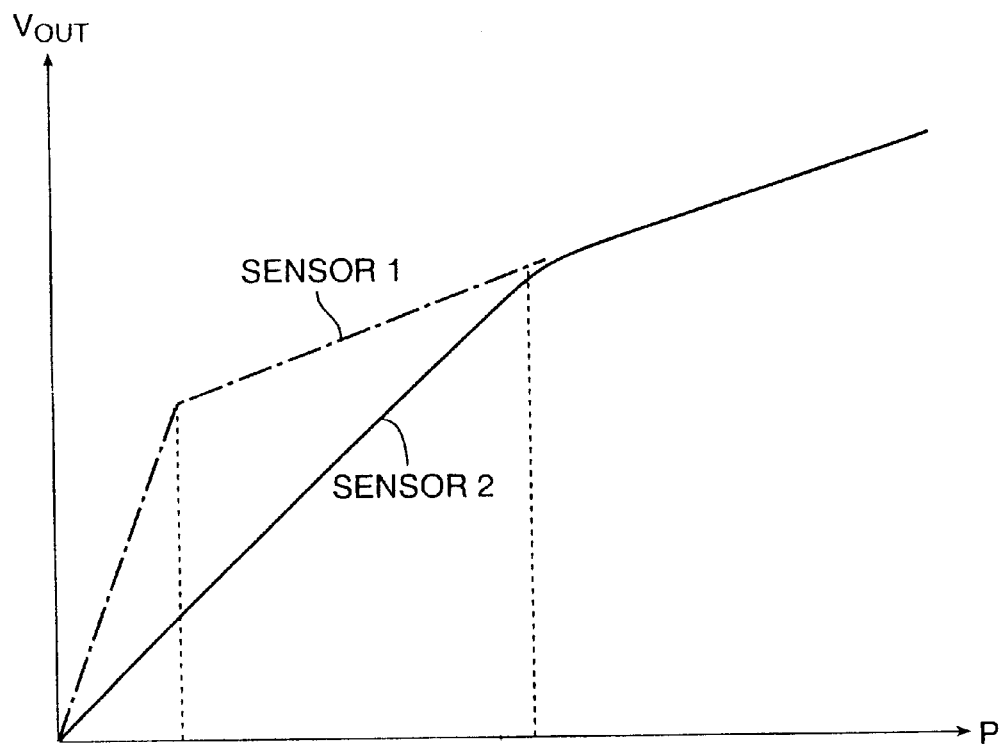
FIG. 1 is a diagram comparing performance of two pressure sensors with different sensitivity.
Figure 2C:
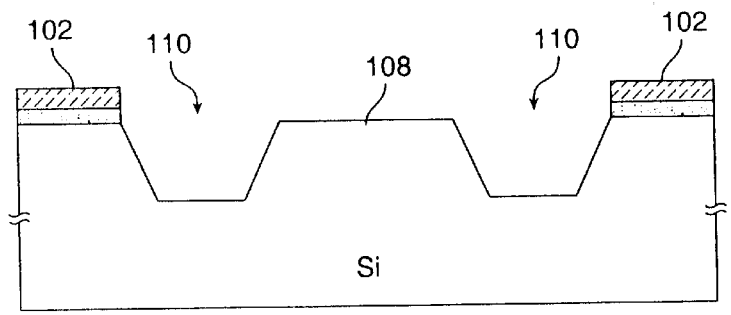
Figure 2D:
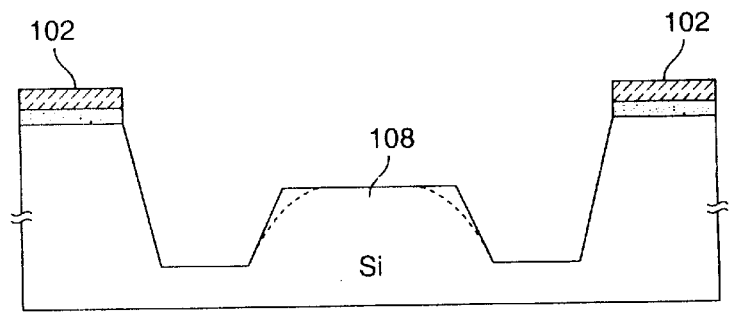
Figure 2E:
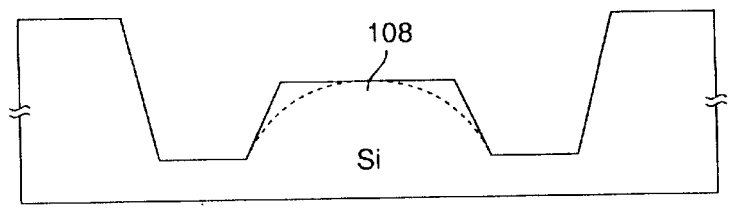

As shown in FIG. 2C, the resulting structure after the preceding photolithography process, is a die surface having an exposed area including a 40–50 μm deep trench 110 with a boss 108 in its center, and a thick peripheral area or frame that is covered by Oxide or Nitride protective layer 102. During the next step, a deep etch is performed using either electrochemical or timed etch techniques to etch the exposed region (window 104 of FIG. 1A) deep enough to achieve the desired thickness for the diaphragm at the bottom of trench 110. At the end of the deep etching process, the step differential between the bottom of trench 110 and the surface of boss 108 remains essentially the same as defined by the previous shallow pre-etch step. The deep etch step does round the edges and corners of the resulting boss structure (shown in broken lines in FIG. 2D), but the boss maintains a near trapezoidal shape. In the final step, Oxide/Nitride layer 102 is removed resulting in the thin-bossed diaphragm structure shown in FIG. 2E.

By thus creating the cavity in two steps of a shallow pre-etch followed by a deep etch, the process of the present invention avoids performing lithography in deep cavities that is often very difficult to accurately control and implement. Further, the process does not introduce different processing steps such as extra deposition or oxidation steps, and thus minimizes the number of additional steps required, and is fully compatible with conventional micromachining processes used in mass production.

In conclusion, the present invention provides an improved pressure sensing device with a thin-bossed diaphragm, and a process to manufacture the same that involves minimal additional steps and is fully compatible with conventional bulk micromachining processes that are used to make standard pressure sensors. While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents.

What is claimed is:

1. A method of manufacturing a pressure sensor comprising the steps of:

providing a silicon substrate having a first thickness; and forming a cavity in the silicon substrate to obtain a diaphragm having a second thickness substantially smaller than the first thickness, wherein, the step of forming a cavity leaves in its center a boss structure that has a third thickness that is substantially smaller than the first thickness and is larger than the second thickness, wherein the third thickness is chosen to reduce sensitivity of the pressure sensor to gravitational forces.

2. The method of manufacturing a pressure sensor as in claim 1 wherein the step of forming a cavity further comprises the steps of:

defining a region on the surface of the silicon substrate as diaphragm window;

performing a shallow pre-etch of a selected region of the diaphragm window to obtain a boss having a desired thickness; and performing a deep etch of the entire diaphragm window.

3. The method of manufacturing a pressure sensor as in claim 2 wherein the step of defining comprises a step of forming a protective mask covering the surface of the silicon substrate except for the selected region of the diaphragm window.

4. The method of manufacturing a pressure sensor as in claim 3 wherein the protective mask comprises a first portion that covers the area around the diaphragm window, and a second portion that lays over the diaphragm window.

5. The method of manufacturing a pressure sensor as in claim 4 wherein the second portion of the protective mask that lays over the diaphragm window comprises a corner compensation structure.

6. The method of manufacturing a pressure sensor as in claim 5 further comprising a step of removing the second portion of the protective mask after the step of performing a shallow pre-etch and before the step of performing a deep etch.

7. The method of manufacturing a pressure sensor as in claim 6 wherein the step of removing the second portion of the protective mask comprises a photolithography process.

8. The method of manufacturing a pressure sensor as in claim 7 wherein the photolithography process comprises the steps of:

spinning photoresist on the surface of the silicon substrate;

exposing a region corresponding to the diaphragm window by a mask; and etching away the second portion of the protective mask in the exposed region.

9. The method of manufacturing a pressure sensor as in claim 8 wherein the step of spinning is performed at a reduced speed of 350–600 rpm.

10. The method of manufacturing a pressure sensor as in claim 6 wherein the step of performing a deep etch forms a diaphragm with a thickness that is substantially less than 20 μm and a boss with a thickness that is anywhere from 2 to 10 times larger than the thickness of the diaphragm.

11. A pressure sensing device manufactured using the process of claim 2.

* * * * *

UNITED STATES PATENT AND TRADEMARK OFFICE
CERTIFICATE OF CORRECTION

PATENT NO.    : 6,093,579
DATED         : Jul. 25, 2000
INVENTOR(S)   : Sathe

It is certified that error appears in the above-identified patent and that said Letters Patent is hereby corrected as shown below:

"Assignee. Exar Corporation, Fremont, Calif." should read

--Assignee: Silicon Microstructures, Inc., Fremont, Calif.--

Signed and Sealed this

Seventeenth Day of April, 2001

*Attest:*

NICHOLAS P. GODICI

*Attesting Officer*     *Acting Director of the United States Patent and Trademark Office*